US012188902B2

(12) United States Patent
Doshida et al.

(10) Patent No.: US 12,188,902 B2
(45) Date of Patent: Jan. 7, 2025

(54) METHOD FOR EVALUATING CLEANLINESS OF STEEL MATERIAL

(71) Applicant: NSK Ltd., Tokyo (JP)

(72) Inventors: Tomoki Doshida, Fujisawa (JP); Hiroyuki Uchida, Fujisawa (JP); Sho Hashimoto, Fujisawa (JP); Hideyuki Hidaka, Fujisawa (JP)

(73) Assignee: NSK Ltd., Tokyo (JP)

( * ) Notice: Subject to any disclaimer, the term of this patent is extended or adjusted under 35 U.S.C. 154(b) by 309 days.

(21) Appl. No.: 17/754,008

(22) PCT Filed: Oct. 2, 2020

(86) PCT No.: PCT/JP2020/037598
§ 371 (c)(1),
(2) Date: Mar. 21, 2022

(87) PCT Pub. No.: WO2021/070751
PCT Pub. Date: Apr. 15, 2021

(65) Prior Publication Data
US 2022/0381740 A1 Dec. 1, 2022

(30) Foreign Application Priority Data
Oct. 9, 2019 (JP) .................... 2019-186330

(51) Int. Cl.
*G01N 29/11* (2006.01)
*G01N 29/04* (2006.01)
(Continued)

(52) U.S. Cl.
CPC ........... *G01N 29/043* (2013.01); *G01N 29/11* (2013.01); *G01N 29/265* (2013.01); *G01N 29/28* (2013.01);
(Continued)

(58) Field of Classification Search
CPC .... G01N 29/043; G01N 29/11; G01N 29/265; G01N 29/28; G01N 29/348;
(Continued)

(56) References Cited

U.S. PATENT DOCUMENTS 6,318,178 B1 * 11/2001 Kato ................. G01N 29/4418
73/620
6,550,333 B1 * 4/2003 Kiuchi .................... F16H 15/38
73/593
(Continued)

FOREIGN PATENT DOCUMENTS

JP 9-138222 A 5/1997
JP 2004-144289 A 5/2004
(Continued)

OTHER PUBLICATIONS

International Search Report (PCT/ISA/210) issued in PCT Application No. PCT/JP2020/037598 dated Dec. 8, 2020 with English translation (four (4) pages).
(Continued)

*Primary Examiner* — David J Bolduc
(74) *Attorney, Agent, or Firm* — Crowell & Moring LLP

(57) ABSTRACT

There is provided a method for evaluating the cleanliness of a steel material by an ultrasonic flaw detection method enabling rapid acquisition of highly reliable data. Ultrasonic flaw detection is performed to detect a flaw in at least one part in the range of 90% or more and 100% or less of a steel material (for example, round bar 2) at a radial position where the center of the steel material is set as 0% and the surface is set as 100%, and then the cleanliness is evaluated based on the dimension and the number of inclusions in the steel material obtained by the ultrasonic flaw detection.

8 Claims, 2 Drawing Sheets

(51) Int. Cl.
*G01N 29/265* (2006.01)
*G01N 29/28* (2006.01)
*G01N 29/34* (2006.01)

(52) U.S. Cl.
CPC ... *G01N 29/348* (2013.01); *G01N 2291/0234* (2013.01); *G01N 2291/0289* (2013.01); *G01N 2291/044* (2013.01); *G01N 2291/263* (2013.01); *G01N 2291/2696* (2013.01); *G01N 2291/2697* (2013.01)

(58) Field of Classification Search
CPC ... G01N 2291/0234; G01N 2291/0289; G01N 2291/044; G01N 2291/263; G01N 2291/2696; G01N 2291/2697; G01N 29/04; G01N 2291/2698; G01N 29/24
See application file for complete search history.

(56) References Cited

U.S. PATENT DOCUMENTS

| | | | | |
|---|---|---|---|---|
| 2001/0001172 A1* | 5/2001 | Kiuchi | ................ | G01M 13/045 73/593 |
| 2004/0176210 A1* | 9/2004 | Narai | ...................... | F16H 15/38 476/40 |
| 2004/0252924 A1* | 12/2004 | Kiuchi | ................ | G01N 29/043 384/492 |
| 2006/0048576 A1 | 3/2006 | Kiuchi et al. | | |

FOREIGN PATENT DOCUMENTS

| | | |
|---|---|---|
| JP | 2006-349698 A | 12/2006 |
| JP | 2012-177684 A | 9/2012 |
| JP | 2012-181112 A | 9/2012 |

OTHER PUBLICATIONS

Japanese-language Written Opinion (PCT/ISA/237) issued in PCT Application No. PCT/JP2020/037598 dated Dec. 8, 2020 (four (4) pages).
International Preliminary Report on Patentability (PCT/IB/338 & PCT/IB/373) issued in PCT Application No. PCT/JP2020/037598 dated Apr. 21, 2022 including English translation of document C2 (Japanese-language Written Opinion (PCT/ISA/237) filed on Mar. 21, 2022) (six (6) pages).
Extended European Search Report issued in European Application No. 20875395.4 dated Sep. 21, 2022 (eight (8) pages.

* cited by examiner

METHOD FOR EVALUATING CLEANLINESS OF STEEL MATERIAL

TECHNICAL FIELD

The present invention relates to a method for evaluating the cleanliness of a steel material.

BACKGROUND ART

Conventionally, it is known that the rolling fatigue life of steel used for applications where rolling fatigue occurs, such as bearing steel, has a strong correlation with the amount of non-metallic inclusions in the steel, particularly the amount of oxide inclusions. Therefore, certain quality steel or higher quality steel has been manufactured by measuring the amount of non-metallic inclusions in steel by the JIS method (JIS-G0555) or the ASTM (American Society for Testing and Materials): E45 method, and then feed backing the results to a steelmaking steel.

The amount of the oxide inclusions in the steel naturally has a strong correlation with the oxygen content of the steel. Therefore, for the manufacturing of steel required to have cleanliness, such as bearing steel, various steelmaking methods effective for improving the cleanliness, such as molten steel degassing, vacuum refining, and ladle refining, have been adopted to reduce the oxygen content in the steel.

Herein, recent developments in the steelmaking technology have made it possible to reduce the oxygen content of steel as much as possible. However, when the oxygen content of steel becomes low, the non-metallic inclusions in the steel are very small in amount and size. Therefore, the measurement by the JIS method or the ASTM method described above is measurement in a region close to the detection limit, and thus some cases which are not appropriate as the evaluation of the cleanliness level have been found.

The extreme value statistical method has been adopted as a method for evaluating small inclusions of several tens of μm, the method which has higher measurement accuracy than the measurement accuracy of the JIS method or the ASTM method. The extreme value statistical method is currently a common evaluation method. The evaluation method includes observing 15 to 30 samples in a unit area of about 100 mm² to 200 mm², recording the maximum inclusion diameter for each sample, and predicting the diameter of the maximum inclusion present in an estimated area by a statistical technique.

However, the extreme value statistical method is an evaluation method utilizing the statistics to evaluate a certain area and predict the diameter of the maximum inclusion present in the estimated area, and therefore has had problems of requiring a lot of time and a large load for evaluation and analysis as well as sample preparation.

To address the problems in the conventional cleanliness evaluation methods, such as the JIS method, the ASTM method, and the extreme value statistical method, a method for evaluating the cleanliness of steel by ultrasonic flaw detection is performed as a cleanliness evaluation method having high measurement accuracy and capable of being performed in a short time. For example, PTL 1 discloses, as a method for evaluating the cleanliness of a steel material by an ultrasonic flaw detection method, transmitting ultrasonic waves with a frequency of 25 MHz to 100 MHz to the steel material and measuring the number of inclusions with a diameter of 20 μm or more contained in a surface layer portion from the surface to a predetermined depth of the steel material.

CITATION LIST

Patent Literature

PTL 1: JP 2012-177684 A

SUMMARY OF INVENTION

Technical Problem

In the case of the method described in PTL 1, a 50% or more position when the center of the steel material is set as 0% and the surface is set as 100% is detected as a position in the radial direction (radial position) of the steel material. However, when the radial position where flaw detection is performed is the 50% or more position described above, there is a risk that, depending on the diameter or the material of the steel material, a difference between the ultrasonic transmission amount at a position close to the surface and the ultrasonic transmission amount to a position close to 50% is large, and thus the detectable minimum inclusion dimension becomes large at the position close to 50%, which poses a risk of a reduction in reliability of the purity.

Thus, the present invention has been made focusing on the above-described problems. It is an object of the present invention to provide a method for evaluating the cleanliness of a steel material by an ultrasonic flaw detection method enabling rapid acquisition of highly reliable data.

Solution to Problem

One aspect of the present invention provides a method for evaluating the cleanliness of a steel material including performing ultrasonic flaw detection to detect a flaw in at least one part in the range of 90% or more and 100% or less of the steel material at a radial position where the center of the steel material is set as 0% and the surface is set as 100%, and then evaluating the cleanliness based on the dimension and the number of inclusions in the steel material obtained by the ultrasonic flaw detection.

Advantageous Effects of Invention

One aspect of the present invention can provide a method for evaluating the cleanliness of a steel material by an ultrasonic flaw detection method enabling rapid acquisition of highly reliable data.

DESCRIPTION OF EMBODIMENTS

Figure 1:
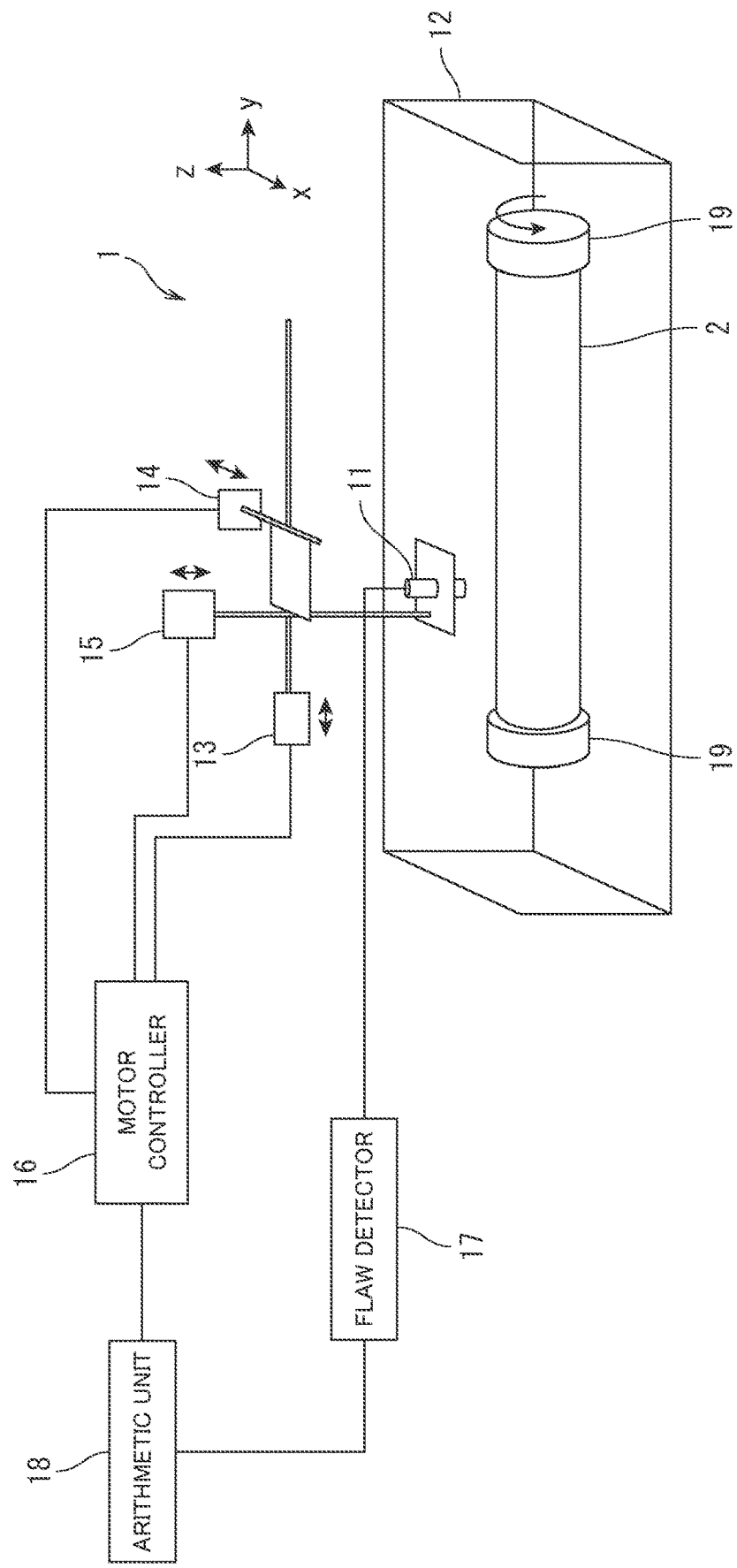
FIG. 1 is a schematic diagram illustrating the configuration of an ultrasonic flaw detection inspection apparatus in one embodiment of the present invention.

In the following detailed description, a large number of specific details are described by exemplifying the embodiment of the present invention to provide a complete understanding of the present invention. However, it is apparent that one or more embodiments can be implemented without such a description of the specific details. For the sake of simplicity, known structures and devices are illustrated in schematic form in the drawings.

<Method for Evaluating Cleanliness of Steel Material>

FIG. 1 illustrates a schematic configuration diagram of an ultrasonic flaw detection inspection apparatus 1 to be used for a method for evaluating the cleanliness of a steel material according to one embodiment of the present invention. The ultrasonic flaw detection inspection apparatus 1 is an apparatus evaluating the cleanliness of a round bar 2 which is a steel material and includes a probe 11, a water tank 12, three motors 13 to 15, a motor controller 16, a flaw detector 17, an arithmetic unit 18, and a chuck device 19 as illustrated in FIG. 1. The steel material for which inclusions are evaluated is a bearing steel in this embodiment, but is not particularly limited insofar as it is a steel material in which defects occur due to non-metallic inclusions (for example, high cleanliness steel, such as case-hardened steel). As products suitable for the present invention, rolling bearings, ball screws, linear guides, traction drive transmissions, electric brakes, and the like can be targeted.

The probe 11 is a focus type ultrasonic probe and detects a flaw in the round bar 2 by transmitting ultrasonic waves and detecting reflected echoes. In the ultrasonic flaw detection method in this embodiment, a vertical flaw detection method is used. More specifically, the probe 11 is provided directly above the center line of the round bar 2 in the water tank 12, and the ultrasonic wave transmission direction is set to a vertical downward direction.

The water tank 12 stores water, which is an ultrasonic wave transmission medium. The probe 11 is provided in the water in the water tank 12.

The three motors 13 to 15 receive control signals of the motor controller 16, so that the probe 11 is moved in each of directions parallel to the x-axis, y-axis, and z-axis. The x-axis, the y-axis, and the z-axis are axes orthogonal to one another. The x-axis direction and the y-axis direction are directions parallel to the horizontal direction. The z-axis direction is a direction parallel to the vertical direction. The y-axis direction is a direction parallel to the longitudinal direction of the round bar 2.

The motor controller 16 is a device, the operation of which is controlled by an input into the arithmetic unit 18 and which controls the positional relationship between the probe 11 and the round bar 2 by controlling the rotation direction, the rotation speed, and the rotation angle of the three motors 13 to 15.

The flaw detector 17 is connected to the probe 11, monitors the flaw detection frequency of the probe 11, reflected echoes, and the size of inclusions detected from the intensity of the reflected echoes, and stores the measurement results thereof in the arithmetic unit 18.

The arithmetic unit 18 is a computer system, such as a personal computer having an arithmetic processing function, contains a ROM, a RAM, a CPU, and the like, and realizing functions described later on software by executing various dedicated programs stored in the ROM or the like in advance. The arithmetic unit 18 stores the measurement results calculated by the flaw detector 17.

The chuck device 19 is a tool fixing the round bar 2 and fixes both ends in the longitudinal direction of the round bar 2. Further, the chuck device 19 can rotate the round bar 2 around the center line by rotating under a driving force of a rotational driving device (not illustrated). The rotation of the chuck device 19 may be controlled by the motor controller 16.

The cleanliness evaluation method according to this embodiment includes rotating the round bar 2 in a fixed direction using the chuck device 19 and performing ultrasonic flaw detection of the round bar 2 by the probe 11. The round bar 2 may be one in a rolled state, but is preferably one subjected to heat treatment after rolling and subjected to surface polishing by turning. The cutting allowance of the surface of the round bar 2 by turning and polishing is not particularly limited and may be set to 1 mm in term of thickness (2 mm in terms of diameter).

In the ultrasonic flaw detection, the frequency of the ultrasonic waves transmitted from the probe 11 is preferably set to 30 MHz or more and 70 MHz or less. By setting the frequency of the ultrasonic flaw detection in such a range, inclusions with a minimum dimension of about 30 µm can be detected. When the frequency of the ultrasonic waves is increased, smaller inclusions can be detected, but, at the same time, the attenuation of the ultrasonic waves increases, which prolongs the measurement time per evaluation volume. When the frequency is lowered, the attenuation of the ultrasonic waves decreases, which is advantageous in terms of the measurement time. However, the minimum dimension of detectable inclusions increases, which poses a risk of erroneously evaluating the cleanliness. More specifically, when only large inclusions can be detected or when only large inclusions are to be measured, the larger the inclusions, the smaller the number of presence per evaluation volume.

Therefore, there is a risk that, unless the evaluation volume is increased, inclusions are overlooked in spite of the presence of large inclusions. Although there is a balance with the evaluation volume, when the frequency range described above is used, a proper cleanliness evaluation can be performed in proper measurement time. The frequency of the ultrasonic waves is more preferably set to 40 MHz or more and 60 MHz or less and still more preferably set to 50 MHz.

The dimension of inclusions may be an index indicating the size of the inclusions and may be the diameter of the inclusions. The dimension of inclusions is not limited to the diameter of the inclusions and may be another index, such as $\sqrt{area}$. More specifically, in the method for evaluating a steel material according to this embodiment, the cleanliness is evaluated based on the dimension of inclusions, which is an index indicating the size of inclusions, and the number of inclusions as described later. Further, with respect to the minimum dimension of inclusions, not only the minimum diameter of inclusions but the minimum value of the other indices, such as $\sqrt{area}$, may be used.

In this embodiment, by performing the ultrasonic flaw detection while rotating the round bar 2, a specific depth range from the surface of the round bar 2 is continuously measured in the circumferential direction. At this time, the specific depth range of the round bar 2 where the ultrasonic flaw detection is performed is set to 90% or more and 100% or less at a radial position. The radial position indicates the position in the radial direction of the round bar 2 when the center of the round bar 2 is set as 0% and the surface of the round bar 2 is set as 100% in the cross section orthogonal to the longitudinal direction of the round bar 2. In this range, the ultrasonic flaw detection may be performed in the entire range or the ultrasonic flaw detection may be performed in a part of the range. More specifically, the ultrasonic flaw detection is performed in at least one part in the range of 90% or more and 100% or less at the radial position. When the radial position of the round bar 2 is in the range of 90% or more and 100% or less, a difference in the cleanliness of the steel material becomes remarkable. Therefore, by detecting this range, highly reliable cleanliness data can be acquired.

Further, in the ultrasonic flaw detection, the evaluation volume, which is a volume subjected to the ultrasonic flaw detection, of the round bar 2 is set to 60000 mm$^3$ or more and preferably 100000 mm$^3$ or more. The evaluation volume is the volume of a region subjected to the flaw detection of the round bar 2 in the ultrasonic flaw detection continuously performed while rotating the round bar 2. When the evaluation volume is less than 60000 mm$^3$, a variation in the number of non-metallic inclusions, which is the cleanliness, increases, and therefore the cleanliness cannot be accurately evaluated. Therefore, the cleanliness can be accurately evaluated by setting the evaluation volume to 60000 mm$^3$ or more, and the cleanliness can be evaluated with higher accuracy by setting the evaluation volume to 100000 mm$^3$ or more. The upper limit of the evaluation volume is not particularly limited and is preferably set to 200000 mm$^3$. When the evaluation volume exceeds 200000 mm$^3$, the time required for the flaw detection is prolonged, and there is no significant difference in the cleanliness evaluation accuracy as compared with a case where the evaluation volume is set to 100000 mm$^3$ or more and 200000 mm$^3$ or less.

Further, in the ultrasonic flaw detection, the probe 11 transmits the flaw detection results, such as the intensity of the reflected echoes, to the flaw detector 17. The flaw detection results in the flaw detector 17 are recorded in the arithmetic unit 18, and the dimension of detected inclusions is calculated. More specifically, the dimension and the number of inclusions contained in the evaluation volume are recorded in the arithmetic unit 18. By setting the frequency of the ultrasonic waves to 30 MHz or more and 70 MHz, the number and the dimension of inclusions with a minimum dimension of about 30 μm or more to be detected are recorded as the results.

After the completion of the ultrasonic flaw detection, the arithmetic unit 18 calculates a cleanliness index, which is a cleanliness evaluation index, from the flaw detection results, thereby evaluating the cleanliness. The cleanliness should have a strong correlation with the bearing life, but the dimension of inclusions and the number of inclusions are mentioned as the main factors as cleanliness parameters correlated with the life. Hence, the cleanliness index is an index calculated using the dimension and the number of inclusions. A method for calculating the cleanliness index is not particularly limited, and may be appropriately set according to the application and the type of a steel material. For example, the cleanliness index may be set such that the higher the index, the worse the cleanliness and the larger the number of inclusions with a large dimension, the higher the index. For example, as the cleanliness index, an index may be used which is determined from the size and the number of inclusions with the square root $\sqrt{area}$ of the area of the inclusions equal to or larger than the predetermined value, the square root $\sqrt{area}$ being used in the extreme value statistical method and calculated from the dimension of detected inclusions.

<Modification>

The present invention is described above with reference to the specific embodiment, but it is not intended to limit the present invention by the description thereof. By referring to the description of the present invention, not only the disclosed embodiment but other embodiments of the present invention including various modifications are also apparent to those skilled in the art. Therefore, it should be understood that the embodiment of the invention described in Claims also covers embodiments including modifications thereof described in this specification alone or in combination.

For example, in the embodiment described above, the steel material for which the cleanliness is evaluated is the round bar 2, but the present invention is not limited to such an example. The steel material may be a square steel bar or a plate material.

Further, in the embodiment described above, the apparatus having the configuration illustrated in FIG. 1 is used as the ultrasonic flaw detection inspection apparatus 1, but the present invention is not limited to such an example. The ultrasonic flaw detection inspection apparatus may have another configuration insofar as the ultrasonic flaw detection of the surface layer of the steel material can be performed under the conditions described above.

Effects of Embodiments (1) A method for evaluating the cleanliness of a steel material according to one aspect of the present invention includes performing ultrasonic flaw detection to detect a flaw in at least one part in the range of 90% or more and 100% or less of a steel material (for example, round bar 2) at a radial position where the center of the steel material is set as 0% and the surface is set as 100%, and then evaluating the cleanliness based on the dimension and the number of inclusions in the steel material obtained by the ultrasonic flaw detection.

The configuration of (1) above enables rapid acquisition of highly reliable cleanliness data. As an example, the ultrasonic flaw detection is performed by arranging a steel material and the probe 11 in an ultrasonic wave transmission medium, and then transmitting ultrasonic waves from the probe 11 to the steel material.

(2) In the configuration of (1) above, the evaluation volume of the steel material to be subjected to the flaw detection is set to 60000 mm$^3$ or more in performing the ultrasonic flaw detection.

(3) In the configuration of (2) above, the evaluation volume is set to 100000 mm$^3$ or more. According to the configurations (2), (3) above, the cleanliness can be evaluated with higher accuracy.

(4) In any one of the configurations (1) to (3) above, the frequency of ultrasonic waves is set to 30 MHz or more and 70 MHz or less in performing the ultrasonic flaw detection. According to the configuration of (4) above, inclusions with a minimum dimension of about 30 μm can be detected.

(5) In any one of the configurations (1) to (4) above, the steel material is a steel material used for rolling bearings, ball screws, linear guides, traction drive transmissions, or electric brakes.

Example 1

Next, Example 1 performed by the present inventors is described. In Example 1, the relationship between the cleanliness and the radial position was examined by measuring the cleanliness at a plurality of radial positions for five samples of the round bar 2 different in diameter and cleanliness. In the examination of Example 1, the round bar 2 was subjected to ultrasonic flaw detection by the same method as in the embodiment described above. As the focus type probe, a probe was used which has a frequency of 50 MHz, an oscillator diameter of 3 mm, and an underwater focal distance of 12.5 mm. In performing the ultrasonic flaw detection, the round bar 2 was gradually ground such that the surface of the round bar 2 to be subjected to the flaw detection reached around 90%, around 70%, around 50%, and around 30% relative to the round bar 2 immediately after rolling. After each grinding, the ultrasonic flaw detection was performed for the ranges described above. In this example, the $\sqrt{area}$ was estimated from the flaw detection results, such as the echo intensity from inclusions, and then the cleanliness index was calculated from the number and the dimension of inclusions with $\sqrt{area}$ of 50 μm or more.

Figure 2:
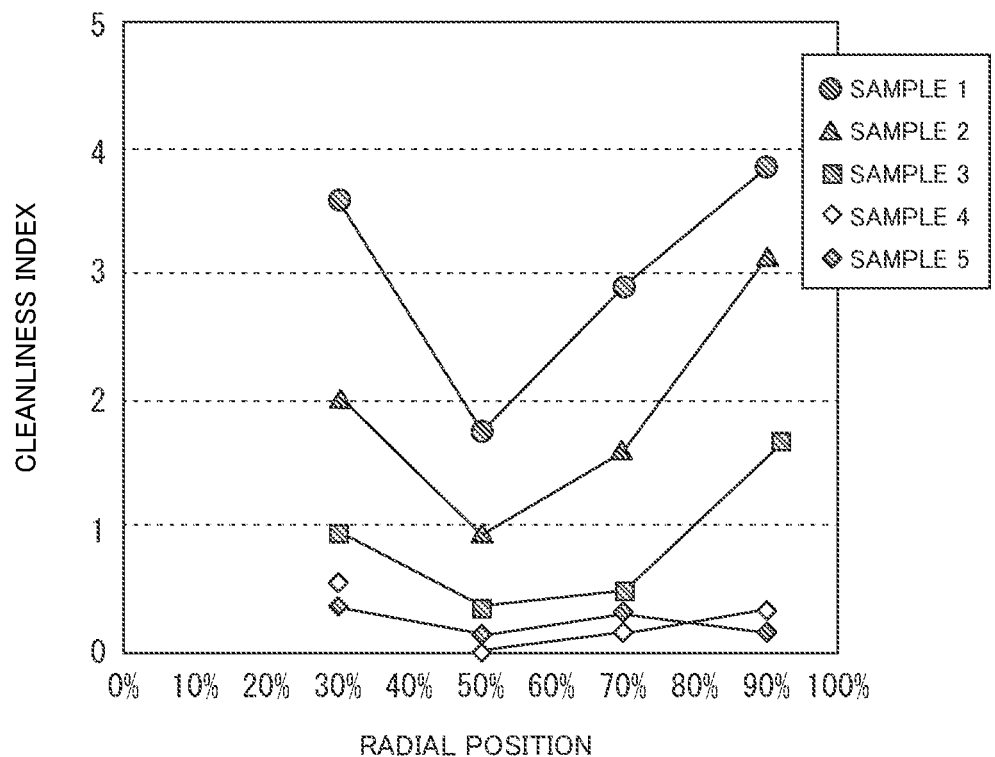
FIG. 2 is a graph illustrating the relationship between the radial position and the cleanliness index in Example 1.

FIG. 2 illustrates the relationship between the radial position and the cleanliness index of the round bar 2 as the results of Example 1. Table 1 illustrates the as-rolled material diameter and the flaw detection position in each sample. The flaw detection position indicates the radial position where the round bar 2 immediately after rolling is subjected to the flaw detection. The cleanliness index is set such that the larger the number of inclusions, the higher the index and the larger the dimension of inclusions, the higher the index.

As illustrated in FIG. 2, it was able to be confirmed that the cleanliness is poor near the center of the steel material (30% position), good at the radial center position (50% position), and poor at a surface portion of the steel material (90 to 100% position). This indicates that a difference between the sample with poor cleanliness and the sample with good cleanliness is remarkable on the surface of the steel material and the difference is hardly presented at the radial center position (50% position). Hence, it was able to be confirmed that the cleanliness of the steel material can be evaluated with high accuracy by evaluating inclusions contained in a 10% depth range (range from 90 to 100% in FIG. 1) at the radial position of this steel material from the steel material surface of the steel material. Further, the rank of the cleanliness does not significantly change inside the steel material, and therefore the measurement from a center portion to the 90% position can be omitted.

described above, and the number of inclusions with $\sqrt{area}$ of 50 μm or more per fixed volume calculated by the same method as in Example 1 was measured a plurality of times in different evaluation volumes. Then, a variation in the number of inclusions in each evaluation volume was determined, thereby examining the measurement accuracy.

Figure 3:
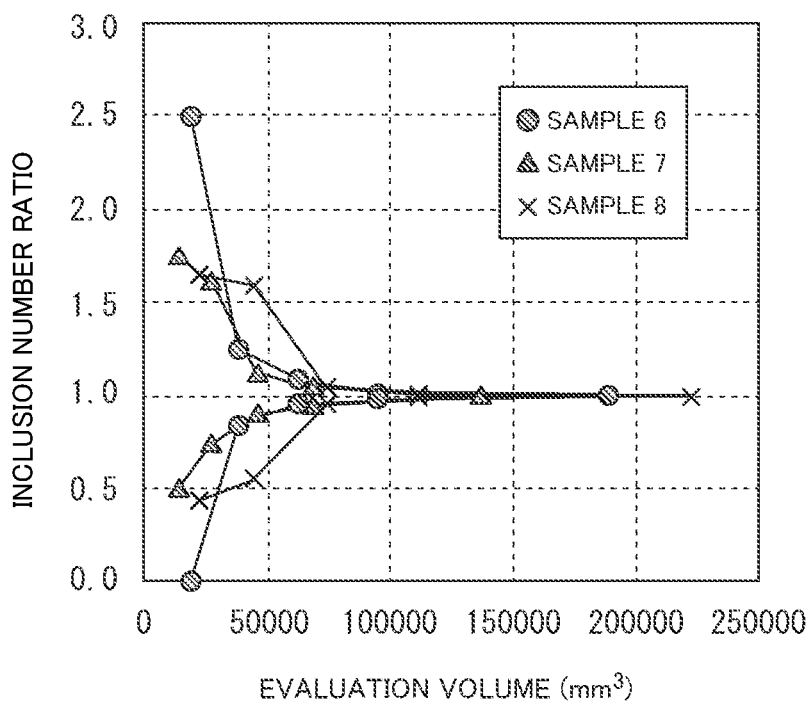
FIG. 3 is a graph illustrating the inclusion number ratio to each evaluation volume in Example 2.

FIG. 3 illustrates the inclusion number ratio in each evaluation volume as the results of Example 2. The inclusion number ratio indicated on the vertical axis in FIG. 3 indicates the number ratio in each evaluation volume when the number in the largest evaluation volume of each sample was set to 1 with respect to the number per fixed volume of inclusions to be measured. The plots with the inclusion number ratios of 1 or more illustrate the maximum variation value in the inclusion number ratio in the same evaluation volume. The plots with the inclusion number ratios of 1 or less illustrate the minimum variation value in the same evaluation volume. Table 2 illustrates the as-rolled material diameter and the evaluation volume (numerical value of the evaluation volume on the horizontal axis in FIG. 3) in each sample.

TABLE 2

|  | As-rolled material diameter (mm) | Data 1 | Data 2 | Data 3 | Data 4 | Data 5 |
|---|---|---|---|---|---|---|
| Sample 6 | 42 | 18830 mm³ | 37659 mm³ | 62766 mm³ | 94149 mm³ | 188297 mm³ |
| Sample 7 | 55 | 13669 mm³ | 27338 mm³ | 45563 mm³ | 68345 mm³ | 136690 mm³ |
| Sample 8 | 50 | 22167 mm³ | 44333 mm³ | 73889 mm³ | 110833 mm³ | 221666 mm³ |

It was able to be confirmed that, when the evaluation volume was small, the ratios of the number of detected inclusions varied, but the inclusion number ratios were stabilized with an increase in the evaluation volume. In particular, it was able to be confirmed that the variation was remarkably small in the regions where the evaluation volume was 60000 mm³ or more and was almost constant in the regions where the evaluation volume was 100000 mm³ or more. From this fact, it was able to be confirmed that the cleanliness can be evaluated accurately and rapidly by setting the evaluation volume to 60000 mm³ or more and preferably 100000 mm³ or more as in the embodiment described above.

TABLE 1

|  | As-rolled material diameter (mm) | Flaw detection position |
|---|---|---|
| Sample 1 | 82 | Around 30%  Around 50%  Around 70%  Around 90% |
| Sample 2 | 65 | Around 30%  Around 50%  Around 70%  Around 90% |
| Sample 3 | 62 | Around 30%  Around 50%  Around 70%  Around 90% |
| Sample 4 | 76 | Around 30%  Around 50%  Around 70%  Around 90% |
| Sample 5 | 72 | Around 30%  Around 50%  Around 70%  Around 90% |

Example 2

Next, Example 2 performed by the present inventors is described. In Example 2, the relationship between the evaluation volume and the measurement accuracy was examined by measuring the number of inclusions per the same volume while changing the evaluation volume for three samples of the round bar 2 different in diameter and cleanliness. In Example 2, the round bar 2 was subjected to ultrasonic flaw detection by the same method as in the embodiment

REFERENCE SIGNS LIST 1 ultrasonic flaw detection inspection apparatus
11 probe
12 water tank
13 to 15 motor
16 motor controller
17 flaw detector
18 arithmetic unit
19 chuck device
2 round bar

The invention claimed is:

1. A method for evaluating cleanliness of a solid steel material comprising:
    performing ultrasonic flaw detection to detect a flaw in at least one part in a range of 90% or more and 100% or less of the solid steel material at a radial position where a center of the solid steel material is set as 0% and a surface is set as 100%; and
    evaluating cleanliness based on a dimension and a number of inclusions in the solid steel material obtained by the ultrasonic flaw detection, wherein
        an evaluation volume of the solid steel material subjected to the ultrasonic flaw detection is at least 100,000 mm$^3$, and
        the solid steel material is a round bar having a diameter between 42 mm and 82 mm.

2. The method according to claim 1, wherein a frequency of ultrasonic waves is set to 41 MHz or more and 70 MHz or less in performing the ultrasonic flaw detection.

3. The method according to claim 1, wherein the solid steel material is used for rolling bearings, ball screws, linear guides, traction drive transmissions, or electric brakes.

4. The method according to claim 1, wherein the ultrasonic flaw detection is performed in such a way that ultrasound is applied while the solid steel material rotates continuously.

5. The method according to claim 1, wherein the ultrasonic flaw detection is performed only in a range of 90% or more and 100% or less of the steel material.

6. The method according to claim 1, further comprising: calculating a cleanliness index, using a result of the ultrasonic flaw detection, wherein the cleanliness index is calculated using the dimension and the number of inclusions.

7. The method according to claim 6, further comprising:
    taking a square root of an area of the inclusions; and
    determining whether the square root of the area of the inclusions is equal to or larger than a predetermined value.

8. The method according to claim 6, further comprising using the square root of the area in an extreme value statistical method.

* * * * *